United States Patent
Milligan et al.

(10) Patent No.: US 7,614,080 B2
(45) Date of Patent: Nov. 3, 2009

(54) SYSTEMS AND METHODS FOR PROVIDING SECURE ACCESS TO EMBEDDED DEVICES USING A TRUST MANAGER AND A SECURITY BROKER

(75) Inventors: Thomas Milligan, South Jordan, UT (US); Bryant Eastham, Draper, UT (US)

(73) Assignee: Panasonic Electric Works Co., Ltd., Osaka (JP)

( * ) Notice: Subject to any disclaimer, the term of this patent is extended or adjusted under 35 U.S.C. 154(b) by 845 days.

(21) Appl. No.: 11/320,164

(22) Filed: Dec. 28, 2005

(65) Prior Publication Data

US 2007/0150932 A1    Jun. 28, 2007

(51) Int. Cl.
*G06F 21/20* (2006.01)
*G06F 15/16* (2006.01)

(52) U.S. Cl. .............. 726/14; 726/1; 726/4; 726/5; 713/156

(58) Field of Classification Search .............. None
See application file for complete search history.

(56) References Cited

U.S. PATENT DOCUMENTS

| | | | |
|---|---|---|---|
| 4,351,982 A | 9/1982 | Miller et al. | |
| 4,633,036 A | 12/1986 | Hellman et al. | |
| 5,142,579 A | 8/1992 | Anderson | |
| 6,079,020 A * | 6/2000 | Liu | 726/15 |
| 6,173,399 B1 * | 1/2001 | Gilbrech | 713/153 |
| 6,226,748 B1 * | 5/2001 | Bots et al. | 726/15 |
| 7,010,702 B1 * | 3/2006 | Bots et al. | 726/13 |
| 7,024,691 B1 * | 4/2006 | Herzberg et al. | 726/5 |
| 7,243,370 B2 * | 7/2007 | Bobde et al. | 726/10 |
| 7,305,705 B2 * | 12/2007 | Shelest et al. | 726/15 |
| 2005/0198506 A1 * | 9/2005 | Qi et al. | 713/170 |
| 2006/0101510 A1 * | 5/2006 | Kadyk et al. | 726/12 |
| 2008/0046993 A1 * | 2/2008 | Mullick et al. | 726/15 |
| 2008/0072311 A1 * | 3/2008 | Mullick et al. | 726/15 |

* cited by examiner

*Primary Examiner*—Christopher A Revak
(74) *Attorney, Agent, or Firm*—Austin Rapp & Hardman

(57) ABSTRACT

A trust manager receives client account information from a client, determines whether the client account information is valid, and determines whether the client is authorized to access one or more embedded devices that are in electronic communication with a security broker. The trust manager also receives security broker account information from the security broker, determines whether the security broker account information is valid, and determines whether the security broker is authorized to provide access to the embedded device(s). If the client account information from the client is valid and the client is authorized to access the embedded device(s), and if the security broker account information from the security broker is valid and the security broker is authorized to provide access to the embedded device(s), the trust manager establishes a secure trusted connection between the client and the security broker.

20 Claims, 15 Drawing Sheets

SYSTEMS AND METHODS FOR PROVIDING SECURE ACCESS TO EMBEDDED DEVICES USING A TRUST MANAGER AND A SECURITY BROKER

TECHNICAL FIELD

The present invention relates generally to computers and computer-related technology. More specifically, the present invention relates to providing secure access to embedded devices using a trust manager and a security broker.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded devices or embedded systems. (The terms "embedded device" and "embedded system" will be used interchangeably herein.) An embedded system usually refers to computer hardware and software that is part of a larger system. Embedded systems may not have typical input and output devices such as a keyboard, mouse, and/or monitor. Usually, at the heart of each embedded system is one or more processor(s).

A lighting system may incorporate an embedded system. The embedded system may be used to monitor and control the effects of the lighting system. For example, the embedded system may provide controls to dim the brightness of the lights within the lighting system. Alternatively, the embedded system may provide controls to increase the brightness of the lights. The embedded system may provide controls to initiate a specific lighting pattern among the individual lights within the lighting system. Embedded systems may be coupled to individual switches within the lighting system. These embedded systems may instruct the switches to power up or power down individual lights or the entire lighting system. Similarly, embedded systems may be coupled to individual lights within the lighting system. The brightness or power state of each individual light may be controlled by the embedded system.

A security system may also incorporate an embedded system. The embedded system may be used to control the individual security sensors that comprise the security system. For example, the embedded system may provide controls to power up each of the security sensors automatically. Embedded systems may be coupled to each of the individual security sensors. For example, an embedded system may be coupled to a motion sensor. The embedded system may power up the individual motion sensor automatically and provide controls to activate the motion sensor if motion is detected. Activating a motion sensor may include providing instructions to power up an LED located within the motion sensor, output an alarm from the output ports of the motion sensor, and the like. Embedded systems may also be coupled to sensors monitoring a door. The embedded system may provide instructions to the sensor monitoring the door to activate when the door is opened or closed. Similarly, embedded systems may be coupled to sensors monitoring a window. The embedded system may provide instructions to activate the sensor monitoring the window if the window is opened or closed.

Some embedded systems may also be used to control wireless products such as cell phones. The embedded system may provide instructions to power up the LED display of the cell phone. The embedded system may also activate the audio speakers within the cell phone to provide the user with an audio notification relating to the cell phone.

Home appliances may also incorporate an embedded system. Home appliances may include appliances typically used in a conventional kitchen, e.g., stove, refrigerator, microwave, etc. Home appliances may also include appliances that relate to the health and well-being of the user. For example, a massage recliner may incorporate an embedded system. The embedded system may provide instructions to automatically recline the back portion of the chair according to the preferences of the user. The embedded system may also provide instructions to initiate the oscillating components within the chair that cause vibrations within the recliner according to the preferences of the user.

Additional products typically found in homes may also incorporate embedded systems. For example, an embedded system may be used within a toilet to control the level of water used to refill the container tank. Embedded systems may be used within a jetted bathtub to control the outflow of air.

As stated, embedded systems may be used to monitor or control many different systems, resources, products, etc. With the growth of the Internet and the World Wide Web, embedded systems are increasingly connected to the Internet so that they can be remotely monitored and/or controlled. Other embedded systems may be connected to computer networks including local area networks, wide area networks, etc. As used herein, the term "computer network" (or simply "network") refers to any system in which a series of nodes are interconnected by a communications path. The term "node" refers to any device that may be connected as part of a computer network.

Some embedded systems may provide data and/or services to other computing devices using a computer network. Alternatively, there may be typical computers or computing devices that provide data and/or services to other computing devices using a computer network. Sometimes it is beneficial to minimize the number of secrets required to maintain secure connections. Using large numbers of secrets can cause additional traffic over the network. These situations, as well as others, may cause inefficiencies in communication across the network. Benefits may be realized if systems and methods were available to provide secure access to embedded devices using a trust manager and a security broker.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
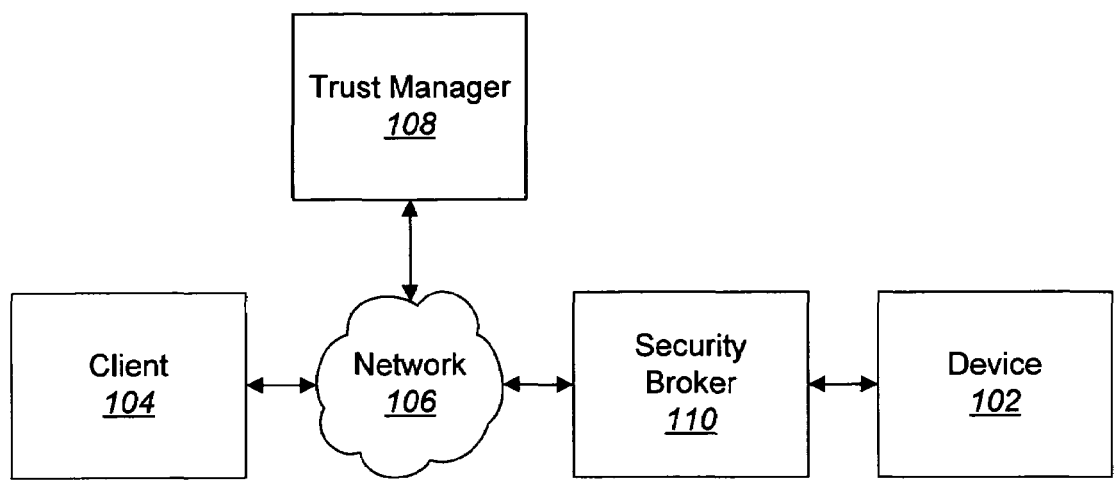
FIG. 1 is a block diagram illustrating a system for providing secure access to embedded devices using a trust manager and a security broker according to an embodiment.

Systems and methods for providing secure access to embedded devices using a trust manager and a security broker are disclosed. In an exemplary embodiment, a trust manager receives from a client a request for access to at least one embedded device that is in electronic communication with a security broker. The trust manager receives client account information from the client, determines whether the client account information is valid, and determines whether the client is authorized to access the embedded device(s). The trust manager also receives security broker account information from the security broker, determines whether the security broker account information is valid, and determines whether the security broker is authorized to provide access to the embedded device(s). If the client account information from the client is valid and the client is authorized to access the embedded device(s), and if the security broker account information from the security broker is valid and the security broker is authorized to provide access to the embedded device(s), the trust manager establishes a secure trusted connection between the client and the security broker.

The method just described may be performed in response to a request from the client for access to the embedded device(s). Alternatively, the method may be performed in response to a request from the security broker.

The client account information may include security credentials for the client, and authorization information for the client. The security credentials for the client may include a client identifier and a client secret. The authorization information for the client may include device access permissions, i.e., the device(s) that the client is authorized to access.

Similarly, the security broker account information may include security credentials for the security broker, and authorization information for the security broker. The security credentials for the security broker may include a security broker identifier and a security broker secret. The authorization information for the security broker may include device provide permissions, i.e., the device(s) for which the security broker is authorized to provide access.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

Providing a secure network of devices and clients that want to interact securely is difficult to manage and may even not be possible with some devices. As the scale of the network grows, the management problem may likewise grow. For example, it is difficult to store and manage security credentials for potentially millions of devices.

A security broker may be granted permissions that allow it to provide access to various devices. A trust manager may establish trust between a client and a security broker. A trust manager and security broker may be beneficial because a device may not be capable of providing security credentials, such as a device identification and secret. The device may also be unable to communicate with the required security protocols. A trust manager and security broker may also be beneficial in order to reduce the number of security credentials that may be installed, configured, and managed for the network. A security broker may be connected to several devices. Using a security broker with a trust manager may eliminate the need to store the secrets for each device on the trust manager. Instead, the trust manager would only need to store one secret for each security broker. This may significantly reduce the number of secrets stored on the trust manager.

In a typical network, a secure access point may have implied trust between endpoints in the network. This implied trust of a secure access point can open one of the endpoints to unrestricted access from the other endpoint. This unrestricted access is problematic from a security point of view.

In contrast to implied trust of a secure access point, a security broker may use a trust manager that establishes the devices to which the security broker can provide secure access and place restrictions on the type of access allowed. For a client to access a device through the security broker, the client may be required to have specific, enumerated device permissions and the broker may be required to have specific, enumerated device proxy permissions. In some embodiments, if a client is granted access, it can trust that the security broker can provide access to the device to which the client requested access.

FIG. 1 is a block diagram illustrating a system 100 for providing secure access to an embedded device 102 using a trust manager 108 and a security broker 110 according to an embodiment. A client 104 is in electronic communication with the trust manager 108 and the security broker 110. Communication among the client 104, the trust manager 108, and the security broker 110 may occur via one or more networks 106.

A device 102 is also in electronic communication with the security broker 110. The device 102 may communicate with the security broker 110 over one or more networks (not shown). Of course alternate embodiments may include more than a single client 104, security broker 110 or device 102.

Figure 2:
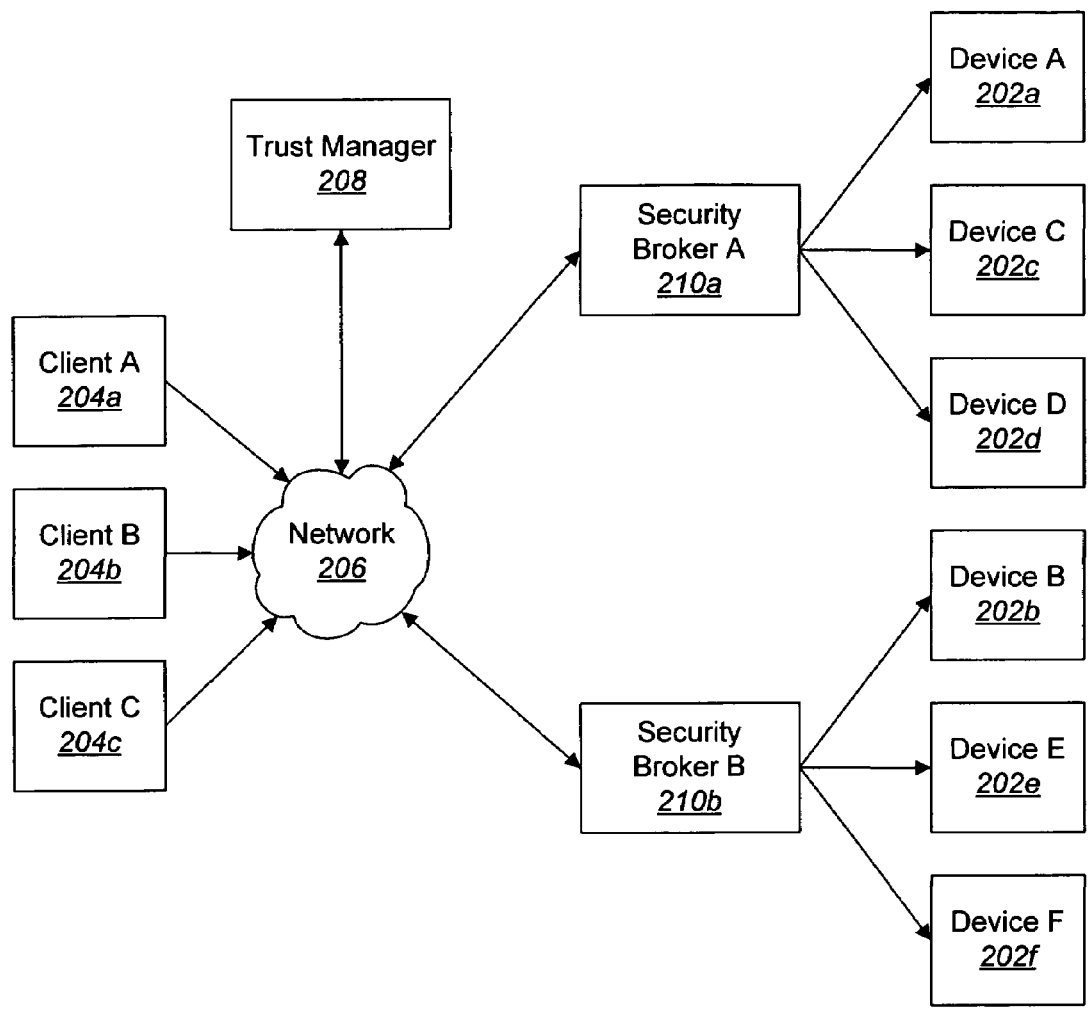
FIG. 2 is a block diagram illustrating a system for providing secure access to embedded devices using a trust manager and a security broker according to another embodiment.

FIG. 2 is a block diagram illustrating a system 200 for providing secure access to embedded devices 202 using a trust manager 208 and a security broker 210 according to another embodiment. Like the embodiment of FIG. 1, the system 200 includes a trust manager 208. However, in the embodiment depicted in FIG. 2, the system 200 includes multiple clients 204, multiple security brokers 210 and multiple devices 202. In particular, the system 200 includes client A 204*a*, client B 204*b*, and client C 204*c*. The system 200 also includes security broker A 210*a* and security broker B 210*b*.

The system 200 further includes device A 202*a*, device B 202*b*, device C 202*c*, device D 202*d*, device E 202*e* and device F 202*f*. Communication among the clients 204, the security brokers 210, and the trust manager 208 may occur via one or more computer networks 206. The security brokers 210*a*, 210*b* also are in electronic communication with multiple devices 202. In particular, security broker A 210*a* is in electronic communication with device A 202*a*, device C 202*c* and device D 202*d*. Security broker B 210*b* is in electronic communication with device B 202*b*, device E 202*e* and device F 202*f*.

Figure 3:
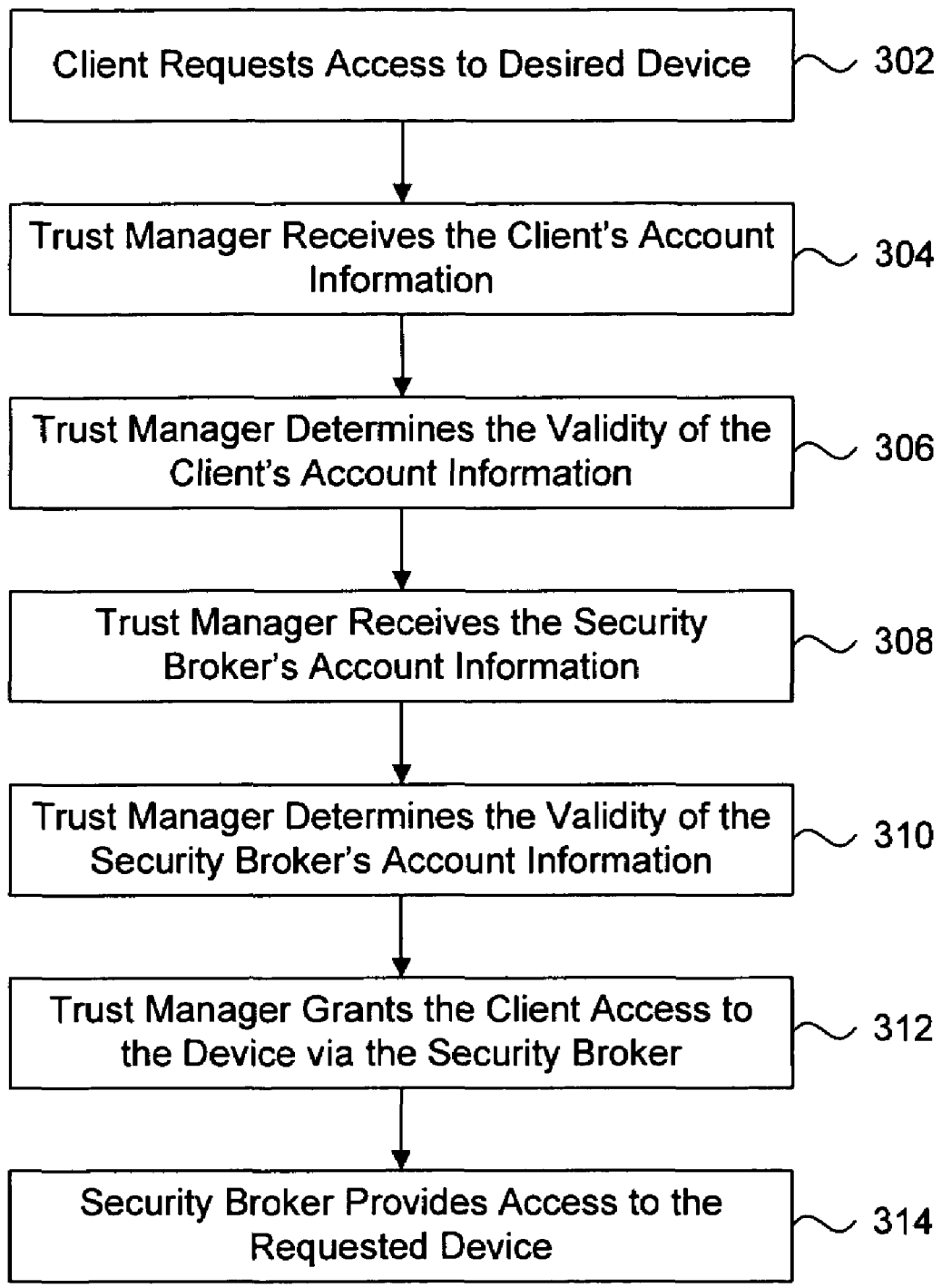
FIG. 3 is a flow diagram that illustrates one embodiment of a method for providing secure access to embedded devices using a trust manager and a security broker.

FIG. 3 is a flow diagram that illustrates one embodiment of a method 300 for providing secure access to embedded devices 102 using a trust manager 108 and a security broker 110. In accordance with the method 300, the client 104 may request 302 access to a desired device 102 from the trust manager 108. A client 104 may desire access to a device, for example, to obtain information stored on the device 102 or services provided by the device 102.

In response to the request received from the client 104, the trust manager 108 may receive 304 the client's account information. Account information may include security credentials and authorization information. Security credentials may be used to determine whether the client 104 is who it represents it is. The security credentials may include a client ID and a client secret. The client's 104 authorization information may identify specific permissions that it wishes to exercise on the device 102.

The trust manager 108 may determine 306 the validity of the client's account information. Determining 306 the validity of the client's account information may involve authenticating the client 104. For example, the trust manager 108 may compare security credentials provided by the client 104 with validated security credentials for the client 104. The validated security credentials may be stored on the trust manager 108. Of course, other methods may be utilized for authenticating the client 104. Determining 306 the validity of the client's account information may also involve verifying that the client 104 is authorized to access the desired device 102. This may involve evaluating the permissions included in the authorization information against those stored in the trust manager 108 for the client 104.

The trust manager 108 may request 308 the security broker's 110 account information. As with the client's 104 account information, the security broker's 110 account information may include security credentials and authorization information. Security credentials may be used to determine whether the security broker 110 is who it represents it is. The security broker's 110 security credentials may include a security broker ID and a security broker secret. The security broker's 110 authorization information may include device permissions, which may indicate the devices 102 for which the security broker 110 is authorized to provide access.

The trust manager 108 may determine 310 the validity of the security broker's account information. Determining 310 the validity of the security broker's 110 account information may involve authenticating the security broker 110. For example, the trust manager 108 may compare security credentials provided by the security broker 110 with validated security credentials for the security broker 110. The validated security credentials may be stored on the trust manager 108. Of course, other methods may be utilized for authenticating the security broker 110. Determining 310 the validity of the security broker's 110 account information may also involve evaluating the device permissions included in the authorization information against those stored in the trust manager 108 for the security broker 110 to verify that it is authorized to provide access to the desired device 102. This may involve evaluating device permissions for the security broker 110.

If the trust manager 108 determines that the client's 104 account information and the security broker's 110 account information are valid, then the trust manager 108 may grant 312 the client 104 access to the requested device 102 via the security broker 110. The security broker 110 then provides 314 access to the requested device 102 to the client 104.

In some embodiments, the client 104 may relay for the security broker 110. In other words, the trust manager 108 may authenticate the security broker 110 based on information that it receives through the client 104 for the security broker 110. If this occurs, it may not be necessary for the trust manager 108 to receive security credentials directly from the security broker 110 itself. Further, in other embodiments, the client 104 may provide its account information at the same time that it requests access to the device 102 to the trust manager 108. In yet further embodiments, all of the required information (client information and security broker information) may be passed from the client 104 to the trust manager 108 at the same time.

Figure 4:
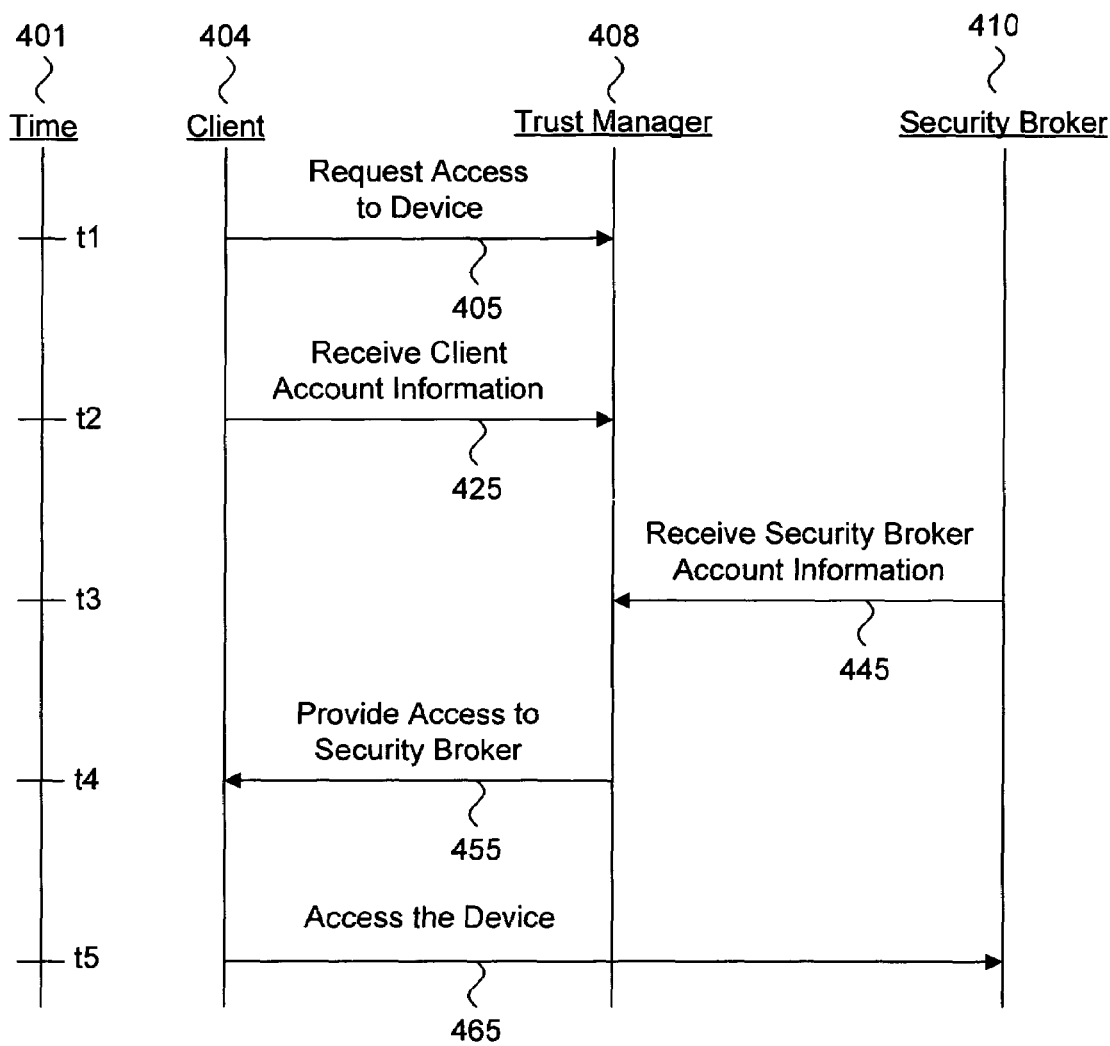
FIG. 4 is a timing diagram illustrating a method for providing secure access to embedded devices using a trust manager and a security broker in a network, where the method is initiated by a client.

FIG. 4 is a timing diagram 400 illustrating communication among a client 404, a trust manager 408, and a security broker 410 according to an embodiment. The timing diagram 400 includes a time axis 401.

At time t1, the client 404 requests 405 access to a device 102 from the trust manager 408. At time t2, the trust manager 408 receives 425 the client's 404 account information. As discussed above, the client's 404 account information may include security credentials (e.g., client ID, client secret) and authorization information (e.g., requested permissions). In response, the trust manager 408 determines the validity of the client's 404 account information.

At time t3, the trust manager 408 receives 445 the security broker's 410 account information. In response, the trust manager 408 determines the validity of the security broker's 410 account information.

If the trust manager 408 is able to verify the client's 404 account information and the security broker's 410 account information, at time t4 the trust manager 408 provides 455 the client 404 access to the security broker 410. At time t5, the client 404 accesses 465 the device 102 through the security broker 410. As noted in conjunction with FIG. 3, alternate embodiments allow the different flows of information noted in FIG. 4 to be combined in different ways.

Figure 5:
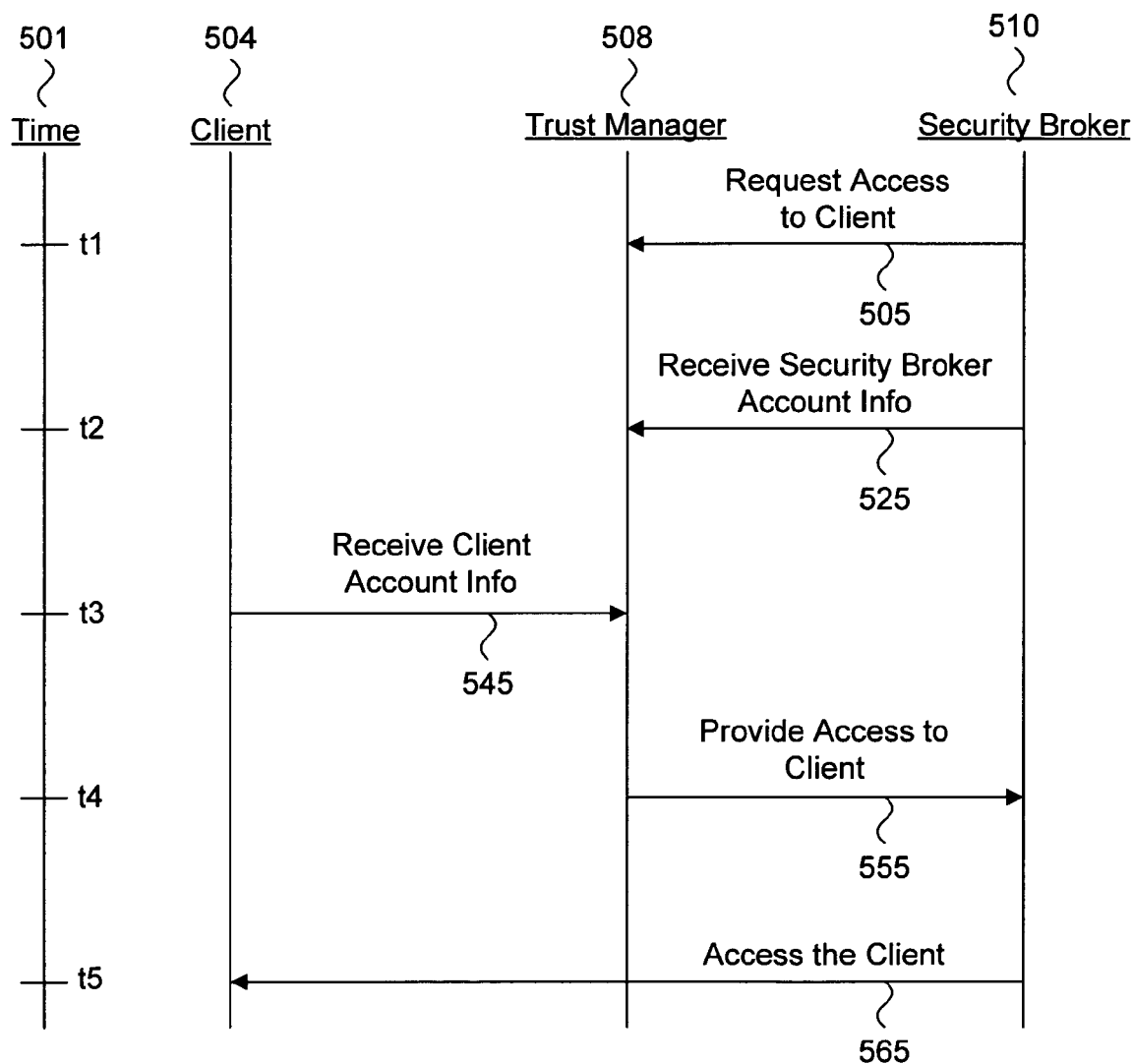
FIG. 5 is a timing diagram illustrating a method for providing secure access to embedded devices using a trust manager and a security broker in a network, where the method is initiated by a security broker.

FIG. 5 is a timing diagram 500 illustrating communication among a client 504, a trust manager 508, and a security broker 510 according to another embodiment. The timing diagram 500 includes a time axis 501.

At time t1, a device 102 (not shown in FIG. 5) requests 505 access to a client 504 from the trust manager 508. The device 102 makes this request via the security broker 510. In an alternate embodiment, the security broker 510 may request access to a client 504 without initiation from a device 102. At time t2, the trust manager 508 receives 525 the security broker's 510 account information. As discussed above, the security broker's 510 account information may include security credentials and authorization information. The security credentials may include a security broker ID and a security broker secret. The authorization information may include device permissions, which may be used by the trust manager 508 to determine whether the device 102 may be provided access to the client 504 through the security broker 510. The trust manager 508 determines the validity of the security broker's 510 account information. At time t3, the trust manager 508 receives 545 the client's 504 account information. The trust manager 508 determines the validity of the client's 504 account information.

If the trust manager 508 is able to verify the client's 504 account information and the security broker's 510 account information, at time t4 the trust manager 508 provides 555 the security broker 510 access to the client 504. At time t5, the security broker 510 accesses 565 the client 504, and the device 102 that initially requested 505 access is able to access the client 504 via the security broker 510.

Figure 6:
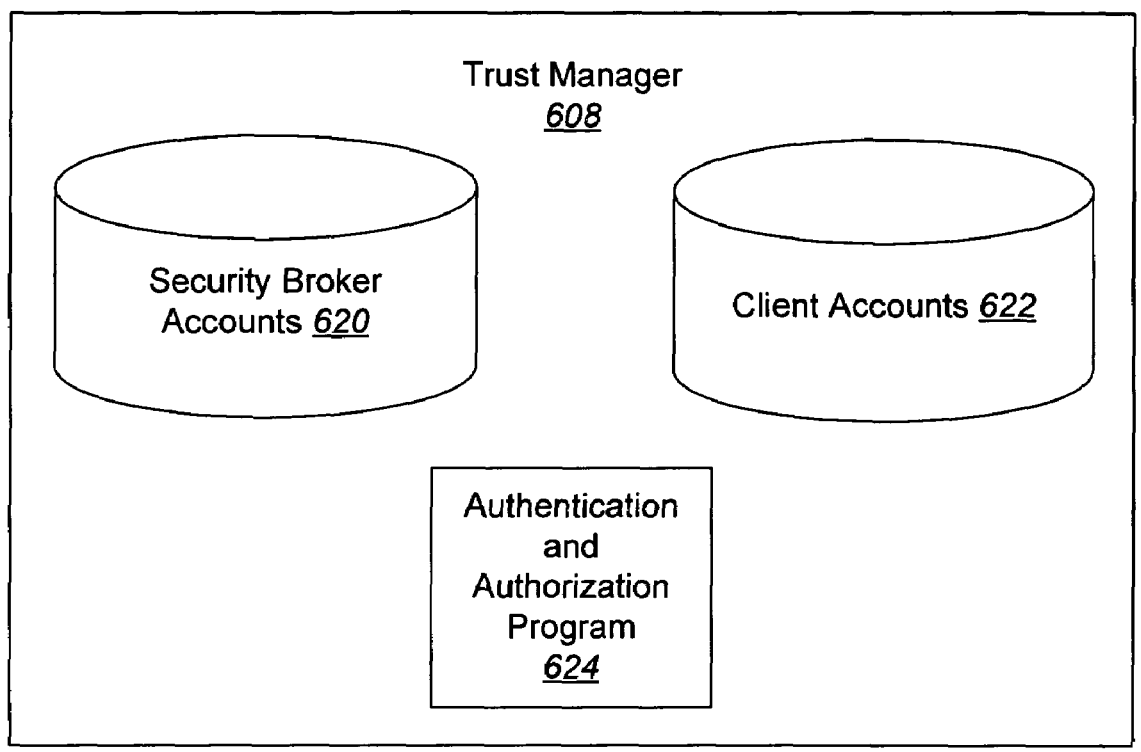
FIG. 6 is a block diagram of an embodiment of the components stored on a trust manager.

FIG. 6 is a block diagram of an embodiment of the components stored on a trust manager 608. The trust manager 608 may include a security broker accounts database 620 and a client accounts database 622. The security broker accounts database 620 may include security credentials and authorization information for one or more security brokers 110. The client accounts database 622 may include security credentials and authorization information for clients 104. The contents of the client accounts database 622 and the security broker accounts database 620 will be discussed in greater detail below. These databases 620, 622 may be used by an authentication and authorization program 624 stored on the trust manager 608 to determine the validity of account information that is provided to the trust manager 608. Of course the trust manager 608 may be implemented with the authentication and authorization program 624 on a separate node from the databases 620, 622.

Figure 7:
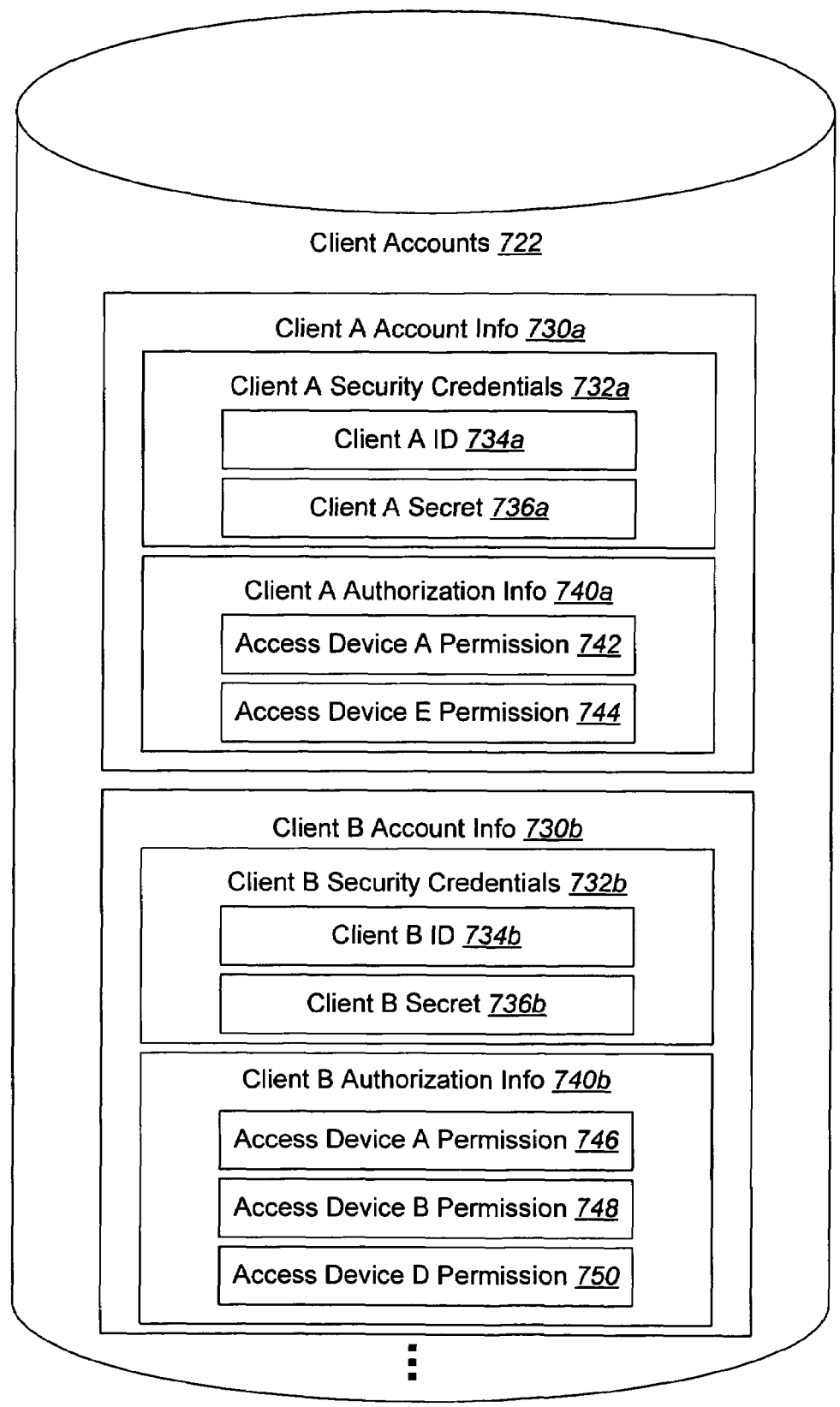
FIG. 7 is a block diagram of an embodiment of a client accounts database stored on a trust manager.

FIG. 7 is a block diagram of an embodiment of a client accounts database 722 stored on a trust manager 108. The client accounts database 722 may include client account information 730a, 730b. The client account information 730 may include client security credentials 732a, 732b and client authorization information 740a, 740b. The client security credentials 732a, 732b may include client IDs 734a, 734b and client secrets 736a, 736b.

The client authorization information 740 may include allowed permissions 742, 744, 746, 748, 750. The allowed permissions 742, 744, 746, 748, 750 may indicate the devices 102 to which the client 104 has been granted access, and are therefore labeled "access device permissions" in FIG. 7. As discussed above, the client account information 730 may be used to determine whether the client 104 is who it represents it is and whether it is authorized to access a device 102.

Figure 8:
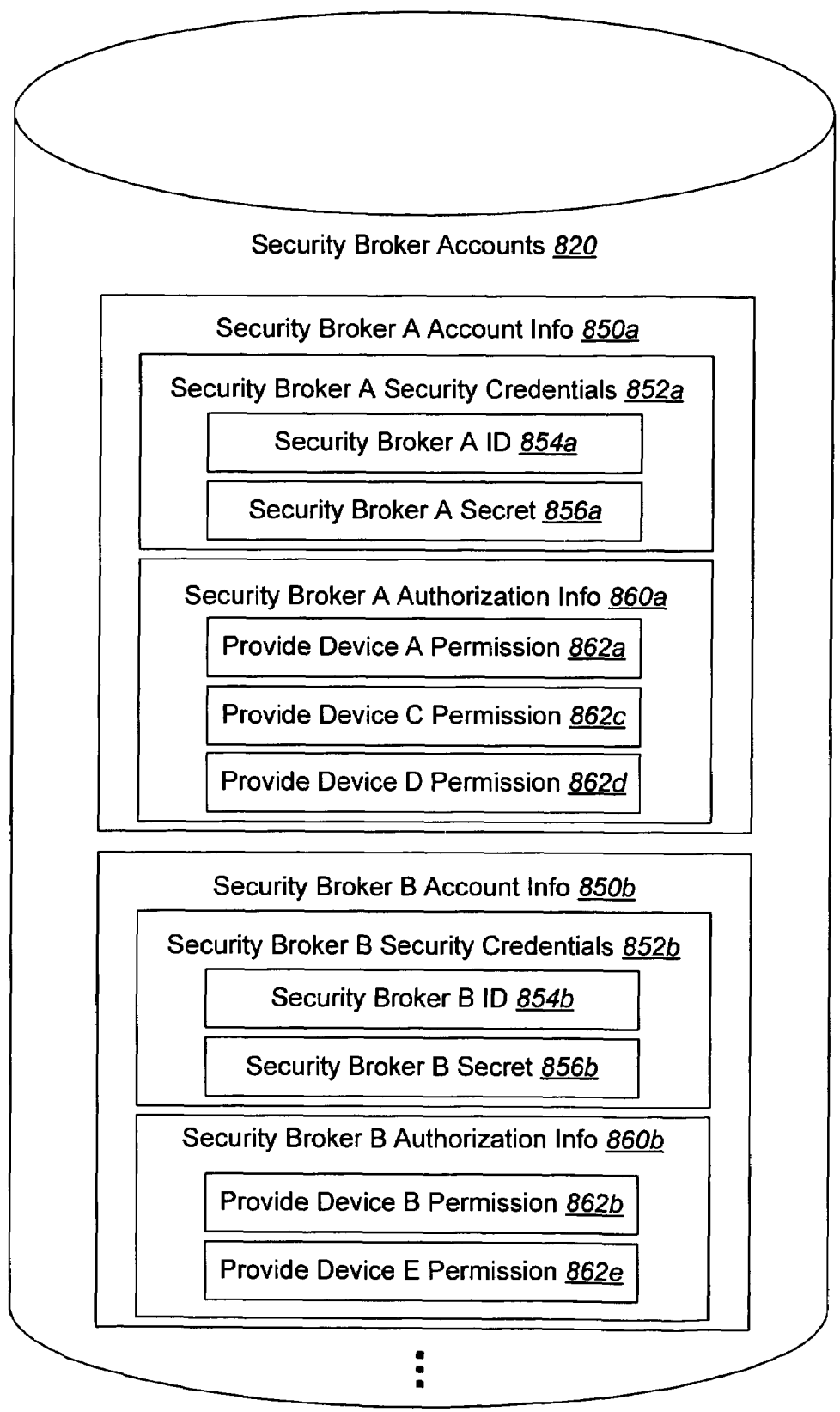
FIG. 8 is a block diagram of an embodiment of a security broker accounts database stored on a trust manager.

FIG. 8 is a block diagram of an embodiment of a security broker accounts database 820 stored on a trust manager 108. The security broker account database 820 may include security broker account information 850a, 850b. The security broker account information 850a, 850b may include security broker security credentials 852a, 852b and security broker authorization information 860a, 860b. The security broker security credentials 852a, 852b may include security broker IDs 854a, 854b and security broker secrets 856a, 856b.

The security broker authorization information 860a, 860b may include device permissions 862a, 862b, 862c, 862d, 862e. The device permissions 862 may indicate the devices 102 to which the security broker 110 is authorized to provide access to a client 104, and are therefore labeled "provide device permissions" in FIG. 8. As discussed above, the security broker account information 850a, 850b may be used to determine whether the security broker 110 is who it represents it is and whether it is authorized to provide access to a device 102.

Figure 9:
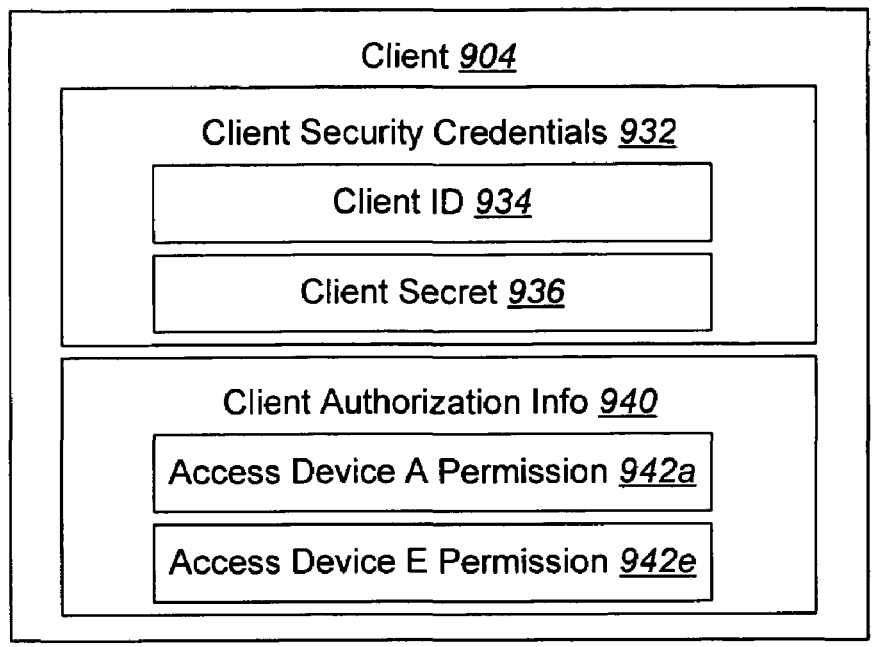
FIG. 9 is a block diagram of an embodiment of a client illustrating the information stored on the client.

FIG. 9 is a block diagram of an embodiment of a client 904 illustrating the information stored on the client 904. The client 904 may include client security credentials 932 and client authorization information 940. The client security credentials 932 may include a client ID 934 and a client secret 936. The client ID 934 and client secret 936 may be provided by the manufacturer or may be provided by the client installer. Alternatively, the client ID 934 and client secret 936 may be chosen by a user after manufacture and installation. Alternatively still, the client ID 934 and client secret 936 may be provided by a user at the time the client initiates the request to the device 102. The client authorization information 940 may include access device permissions 942a, 942e.

Figure 10:
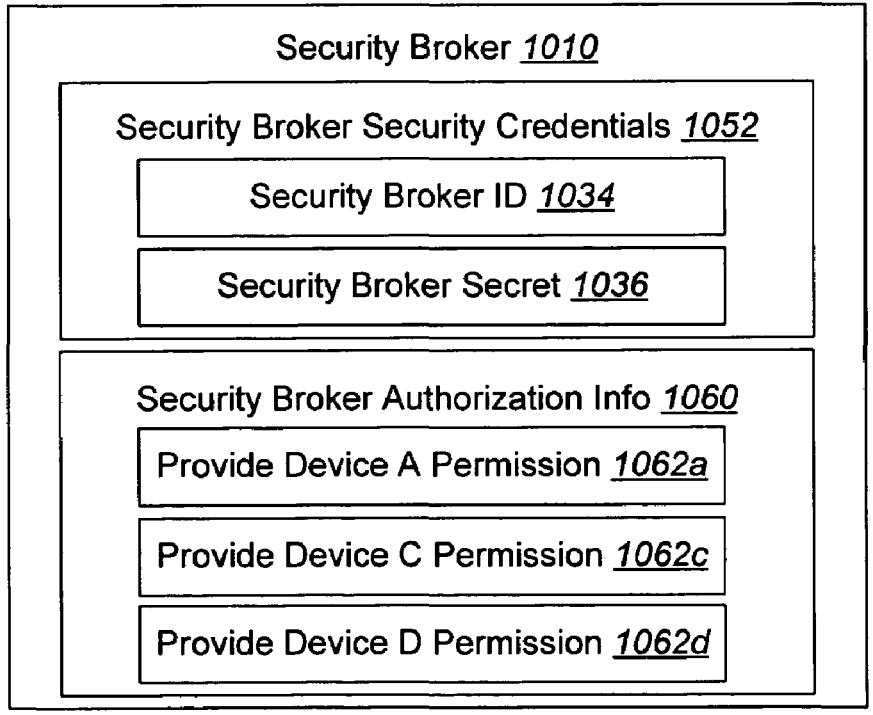
FIG. 10 is a block diagram of an embodiment of a security broker illustrating the information stored on the security broker.

FIG. 10 is a block diagram of an embodiment of a security broker 1010 illustrating the information stored on the security broker 1010. The security broker 1010 may include security broker security credentials 1052 and security broker authorization information 1060. The security broker security credentials 1052 may include a security broker ID 1034 and a security broker secret 1036. Like the client ID 934 and client secret 936, the security broker ID 1034 and security broker secret 1036 may be provided by a manufacturer of the security broker 1010 or by an installer. Alternatively, the security broker ID 1034 and security broker secret 1036 may be chosen by a user after manufacture and installation. The security broker authorization information 1060 may include provide device permissions 1062a, 1062c, 1062d. These permissions represent the ability of the security broker 1010 to represent the respective devices identified in the permissions 1062a, 1062c and 1062d.

Figure 11:
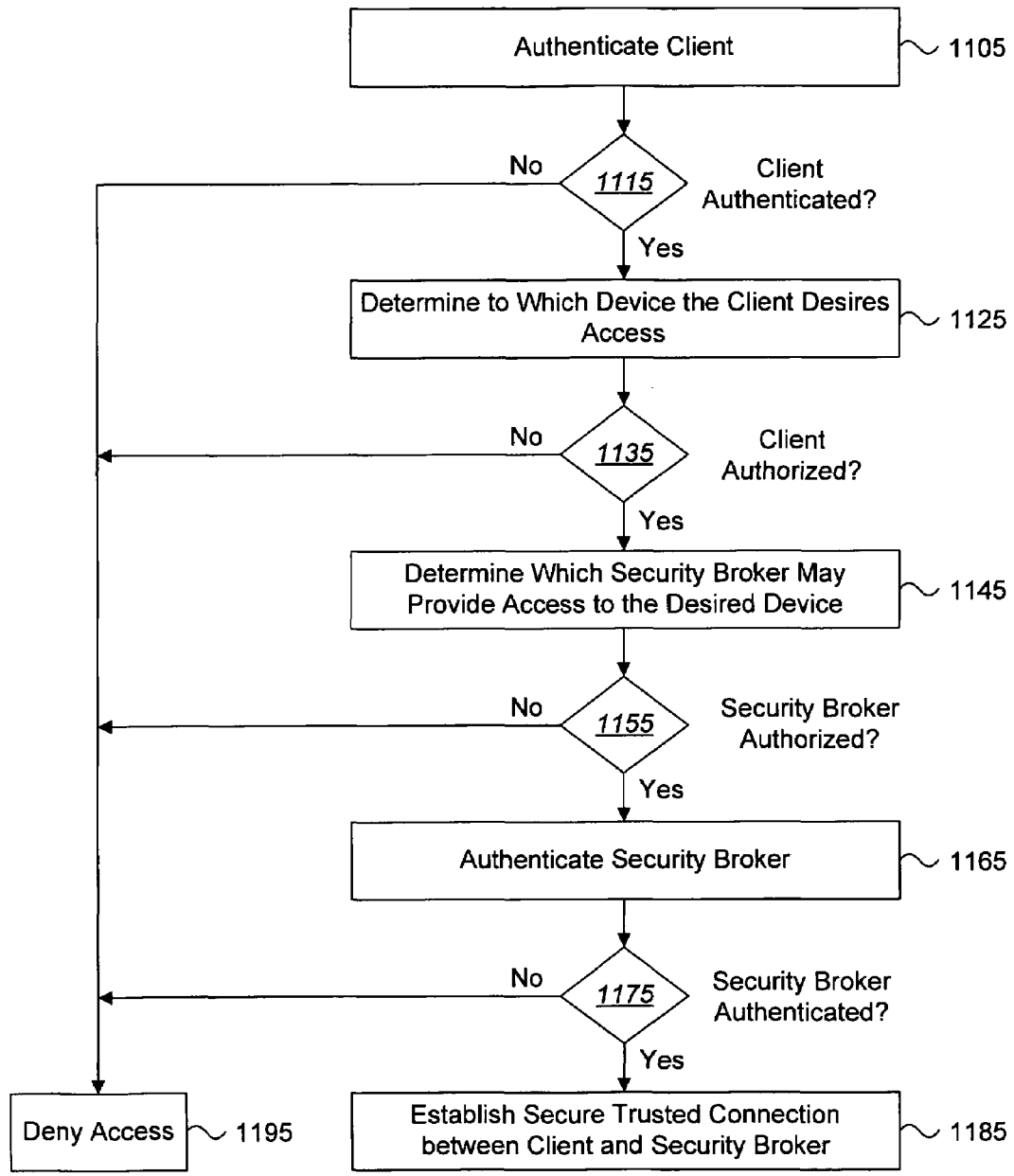
FIG. 11 is a flow diagram of an embodiment of a method for providing secure access to embedded devices using a trust manager and a security broker in a network, where the method is initiated by a client.

FIG. 11 is a flow diagram of an embodiment of a method 1100 for providing secure access to embedded devices 102 using a trust manager 108 and a security broker 110 in a network 106 where the method is initiated by a client 104. In response to a request from a client 104 for access to a device 102, the trust manager 108 may authenticate 1105 the client 104. Authenticating 1105 the client 104 may involve receiving the client's security credentials 932. For example, the trust manager 108 may receive the client ID 934 and client secret 936. The trust manager 108 may compare the client's security credentials 932 with the client security credentials 732 stored in the trust manager's 108 client accounts database 622.

The trust manager 108 may determine 1115 whether the client 104 was authenticated. A client 104 may be authenticated when its security credentials 932 correspond with the client security credentials 732 stored on the trust manager 108. If the trust manager 108 is not able to authenticate the client 104, then the trust manager 108 denies 1195 access to the desired device 102. However, if the trust manager 108 determines 1115 that the client 104 has been properly authenticated, the trust manager 108 may determine 1125 to which device 102 the client 104 desires access. For example, if the client 904 of FIG. 9 were the client attempting to access device A 202a of FIG. 2, the trust manager 108 would determine 1125 that the client 904 desired to access device A 202a.

The trust manager 108 may determine 1135 whether the client 104 is authorized to access the desired device 102. The trust manager 108 may make this determination 1135 by receiving the client's authorization information 940. For example, the trust manager 108 may receive the client's access device permissions 942. The trust manager 108 may compare the client's authorization information 940 with the client authorization information 740 stored in the trust manager's client accounts database 622.

If the client 104 is not authorized to access the desired device 102, then the trust manager 108 denies 1195 the client 104 access to the desired device 102. However, if the client 104 is authorized to access the desired device 102, the trust manager 108 determines 1145 which (if any) security broker 110 may provide access to the desired device 102. The trust manager 108 may make this determination 1145 by querying the security broker accounts database 620 to determine 1145 which security broker 110 is authorized to provide access to the desired device 102. For example, if the client 904 requests access to device A 202a, the trust manager 108 would query its security broker accounts database 620 to find a security broker 110 that has a provide device A permission 862a for device A 202a.

As discussed above, the trust manager 108 may only be in electronic communication with one security broker 110. Where there is only one security broker 110, the trust manager 108 may simply determine 1155 whether the security broker 110 is authorized to provide the client 104 access to the desired device 102.

If the trust manager 108 is not able to identify a security broker 110 that is authorized to provide access to the desired device 102, then the trust manager 108 denies 1195 the client 104 access to the desired device 102. However, if the trust manager 108 identifies a security broker 110 that has the appropriate provide device permission 862, then the trust manager 108 authenticates 1165 that security broker 110. Authenticating 1165 the security broker 110 may include receiving the security broker's security credentials 1052. For example, the trust manager 108 may receive the security broker ID 1034 and security broker secret 1036. The trust manager 108 may compare the security broker's security credentials 1052 with the security broker security credentials 852 stored in the trust manager's security broker accounts database 620. A security broker 110 may be authenticated when its security credentials 1052 correspond with the security broker security credentials 852 stored on the trust manager 108.

If the trust manager 108 determines 1175 that it is unable to authenticate the security broker 110, then the trust manager 108 denies 1195 the client 104 access to the requested device 102. However, if the trust manager 108 determines 1175 that the security broker 110 has been successfully authenticated, then the trust manager 108 may establish 1185 a secure trusted connection between the client 104 and the security broker 110. In an alternate embodiment, the client 104 may indicate the security broker 110 that should provide the access to the device 102. In this case the determination 1145 is already specified, but the validity of the specification may still be verified by checking the security broker security credentials 852 in the broker accounts database 620.

Figure 12:
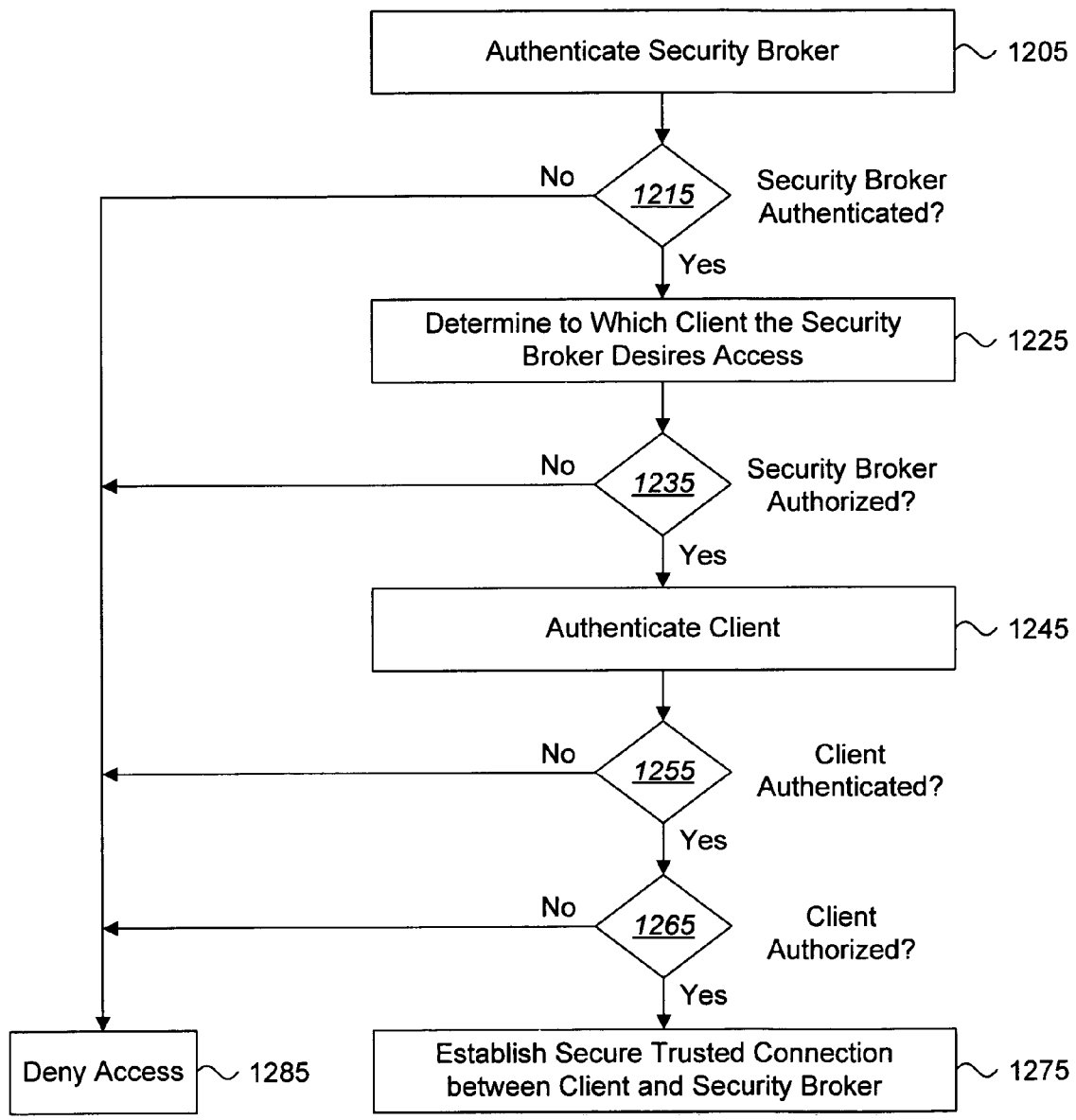
FIG. 12 is a flow diagram of an embodiment of a method for providing secure access to embedded devices using a trust manager and a security broker in a network, where the method is initiated by a security broker.

FIG. 12 is a flow diagram of an embodiment of a method 1200 for providing secure access to embedded devices 102 using a trust manager 108 and a security broker 110 in a network 106 where the method 1200 is initiated by a security broker 110. This method 1200 may be used when a security broker 110 wants to access a client 104 on behalf of a device 102.

A security broker 110 may request access to a client 104 from the trust manager 108. In response, the trust manager 108 may authenticate 1205 the security broker 110. The trust manager 108 may determine 1215 whether the security broker 110 was authenticated. As with the embodiment of FIG. 11, a security broker 110 may be authenticated when its security credentials 1052 correspond with the security broker security credentials 852 stored on the trust manager 108.

If the trust manager 108 determines 1215 that it is not able to authenticate the security broker 110, then the trust manager 108 denies 1285 the security broker 110 access to the client 104. However, if the trust manager 108 determines 1215 that the security broker 110 has been properly authenticated, the trust manager 108 may determine 1225 to which client 104 the security broker 110 desires access. For example, if security broker B 210b of FIG. 2 were attempting to access client B 204b of FIG. 2, the trust manager 108 would determine that security broker B 210b desired access to client B 204b.

The trust manager 108 may determine 1235 whether the security broker 110 is authorized to proxy for a device 102 to the desired client 104. The trust manager 108 may make this determination 1235 by receiving the security broker's 110 authorization information 1060. For example, the trust manager 108 may receive the security broker's provide device permissions 1062. The trust manager 108 may compare the security broker's authorization information 1060 with the security broker authorization information 860 stored in the trust manager's security broker accounts database 620.

In the present embodiment, the provide device permissions 1062 may be used to determine 1235 whether the security broker 110 is authorized to proxy for a device 102 to a client 104. For example, if in the embodiment of FIG. 2 security broker B 210b desires to proxy for device B 202b to client B 204b, the trust manager 208 would determine whether security broker B 210b, to which device B 202b is connected, is authorized to allow access to client B 204b. The trust manager 208 would query its security broker accounts database 620 to determine whether security broker B's account information 850b included a provide device B permission 862b. If the trust manager 208 determines that security broker B 210b does contain a provide device B permission 862b, then the security broker B 210b may be authorized to allow client B 204b to access device B 202b and to allow device B 202b to access client B 204b.

In an alternative embodiment, the security broker 110 may have a separate set of permissions that allow it to proxy for a device 102 to a client 104. This separate set of permissions may be stored on the trust manager 108 with its corresponding security broker authorization information 860 in the security broker accounts database 620.

If the trust manager 108 determines 1235 that the security broker 110 is not authorized to provide access to the client 104, then the trust manager 108 denies 1285 the security broker 110 access to the client 104. However, if the trust manager 108 determines 1235 that the security broker 110 is authorized to provide access to the client 104, then the trust manager 108 may attempt to authenticate 1245 the client 104 and may determine 1255 whether the client 104 was authenticated.

If the trust manager 108 determines 1255 that the client 104 was not successfully authenticated, then the trust manager 108 denies 1285 the security broker 110 access to the client 104. However, if the trust manager 108 determines 1255 that the client 104 was successfully authenticated, then the trust manager 108 may also determine 1265 whether the client 104 is authorized to allow the security broker 110 access to the client 104. This may involve receiving the client's authorization information 940 and comparing it to the client authorization information 740 stored in the client accounts database 622 on the trust manager 108.

As discussed above, the client authorization information 740 may include access device permissions 742. The access device permissions 742 may be used to determine 1265 whether the client 104 is authorized to access a device 102 through the security broker 110. For example, if security broker B 210b desires to proxy for device B 202b to client B 204b, the trust manager 208 would determine whether client B 204b is authorized to access device B 202b. The trust manager 208 would query its client accounts database 622 to determine whether client B's account information 730b included an access device B permission 742b. If the trust manager 208 determines that client B 204b does contain an access device B permission 742b, then a secure connection may be established 1275 between security broker B 210b and client B 204b.

In an alternative embodiment, the client 104 may have a separate set of permissions for allowing a security broker 110 to proxy for a device 102 to the client 104. This separate set of permissions may be stored on the trust manager 108 with its corresponding client authorization information 740 in the client accounts database 622.

If the trust manager 108 determines 1265 that the security broker 110 is not authorized to proxy for the device 102 to the client 104, then the trust manager 108 denies 1285 the security broker 110 access to the client 104. However, if the trust manager 108 determines 1265 that the security broker 110 is authorized to proxy for the device 102 to the client 104, then the trust manager 108 may establish 1275 a secure trusted connection between the client 104 and the security broker 110.

Figure 13:
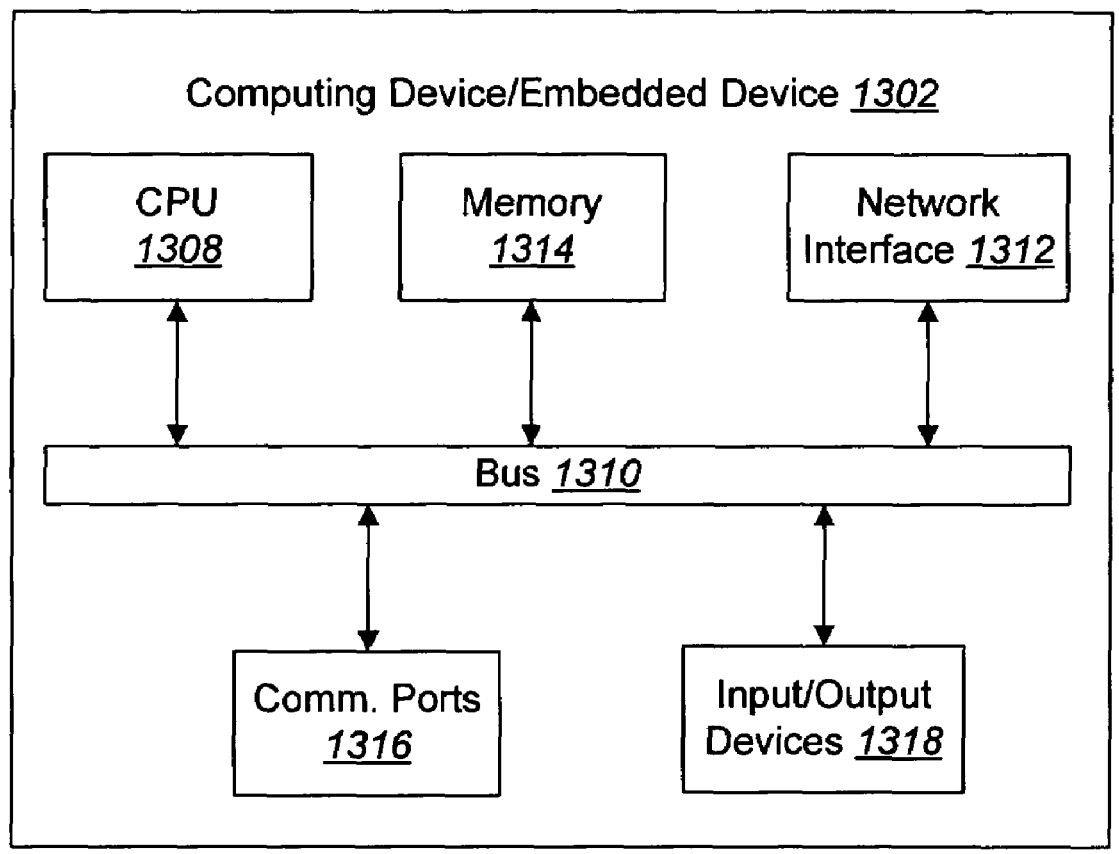
FIG. 13 is a block diagram of hardware components that may be used in an embodiment of a computing device that may be accessed through a security broker.

FIG. 13 is a block diagram of hardware components that may be used in an embodiment of a computing device or an embedded device. A computing device and/or an embedded device may be used as a client 104, security broker 110, trust manager 108, or device 102. A CPU 1310 or processor may be provided to control the operation of the device 1302, including the other components thereof, which are coupled to the CPU 1310 via a bus 1312. The CPU 1310 may be embodied as a microprocessor, microcontroller, digital signal processor or other device known in the art. The CPU 1310 performs logical and arithmetic operations based on program code stored within the memory 1314. In certain embodiments, the memory 1314 may be on-board memory included with the CPU 1310. For example, microcontrollers often include a certain amount of on-board memory.

The computing or embedded device 1302 may also include a network interface 1316. The network interface 1316 facilitates communication between the device 1302 and other devices connected to the network 100. The network 100 may be a pager network, a cellular network, a global communications network, the Internet, a computer network, a telephone network, etc. The network interface 1316 operates according to standard protocols for the applicable network 106.

The device 1302 may also include memory 1314. The memory 1314 may include a random access memory (RAM) for storing temporary data. Alternatively, or in addition, the memory 1314 may include a read-only memory (ROM) for storing more permanent data, such as fixed code and configuration data. The memory 1314 may also be embodied as a magnetic storage device, such as a hard disk drive. The memory 1314 may be any type of electronic device capable of storing electronic information.

The device 1302 may also include communication ports 1318, which facilitate communication with other devices. The device 1302 may also include input/output devices 1320, such as a keyboard, a mouse, a joystick, a touchscreen, a monitor, speakers, a printer, etc.

Figure 14:
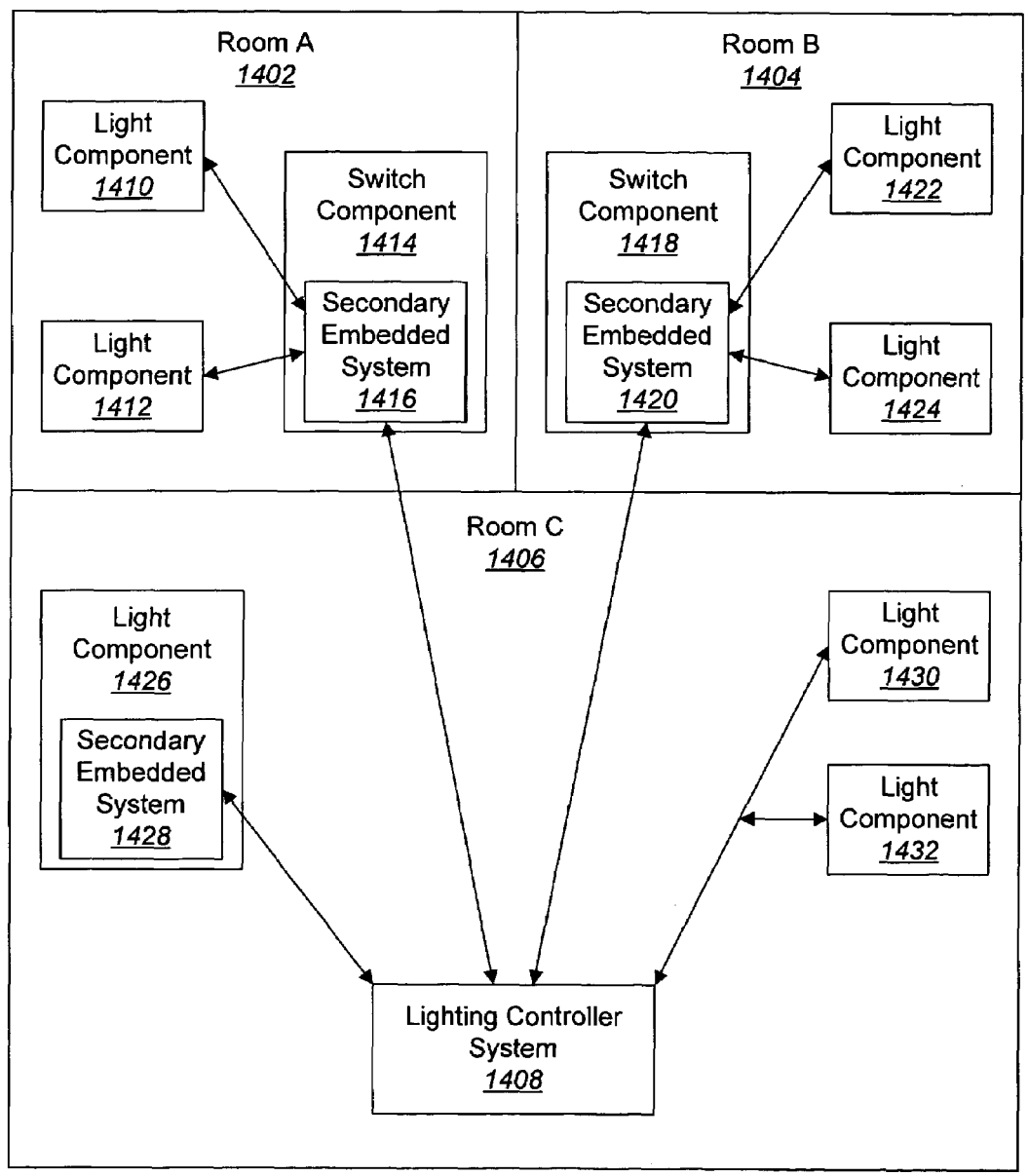
FIG. 14 illustrates an exemplary lighting system in which the present systems and methods may be implemented.

The present systems and methods may be used in several contexts. FIG. 14 illustrates one embodiment of a system wherein the present systems and methods may be implemented. FIG. 14 is a block diagram that illustrates one embodiment of a lighting system 1400 that includes a lighting controller system 1408. The lighting system 1400 of FIG. 14 may be incorporated in various rooms in a home. As illustrated, the system 1400 includes a room A 1402, a room B 1404, and a room C 1406. Although three rooms are shown in FIG. 14, the system 1400 may be implemented in any number and variety of rooms within a home, dwelling, or other environment.

The lighting controller system 1408 may monitor and control additional embedded systems and components within the system 1400. In one embodiment, the room A 1402 and the room B 1404 each include a switch component 1414, 1418. The switch components 1414, 1418 may also include a secondary embedded system 1416, 1420. The secondary embedded systems 1416, 1420 may receive instructions from the lighting controller system 1408. The secondary embedded systems 1416, 1420 may then execute these instructions. The instructions may include powering on or powering off various light components 1410, 1412, 1422, 1424. The instructions may also include dimming the brightness or increasing the brightness of the various light components 1410, 1412, 1422, 1424. The instructions may further include arranging the brightness of the light components 1410, 1412, 1422, 1424 in various patterns. The secondary embedded systems 1416, 1420 facilitate the lighting controller system 1408 to monitor and control each light component 1410, 1412, 1422, 1424 located in the room A 1402 and the room B 1404.

The lighting controller system 1408 might also provide instructions directly to a light component 1426 that includes a secondary embedded system 1428 in the depicted room C 1406. The lighting controller system 1408 may instruct the secondary embedded system 1428 to power down or power up the individual light component 1426. Similarly, the instructions received from the lighting controller system 1408 may include dimming the brightness or increasing the brightness of the individual light component 1426.

The lighting controller system 1408 may also monitor and provide instructions directly to individual light components 1430 1432 within the system 1400. These instructions may include similar instructions as described previously.

In the embodiment of FIG. 14, the lighting controller system 1408 may act as a client 104. The lighting controller system 1408 may desire access to one of the light components 1410, 1412, 1422, 1424, 1426, 1430, 1432, which may be treated as devices 102. Secondary embedded systems 1416, 1420, 1428 may act as both a security broker 110 and a device 102. The lighting controller system 1408 may request access to the secondary embedded systems 1416, 1420, 1428 from a trust manager 108. When the trust manager 108 grants a secure trusted connection between the secondary embedded systems 1416, 1420, 1428 and the lighting controller system 1408, these light components may provide data regarding their status, for example whether a light component is on or off or the current or past wattage passing through the light component.

Figure 15:
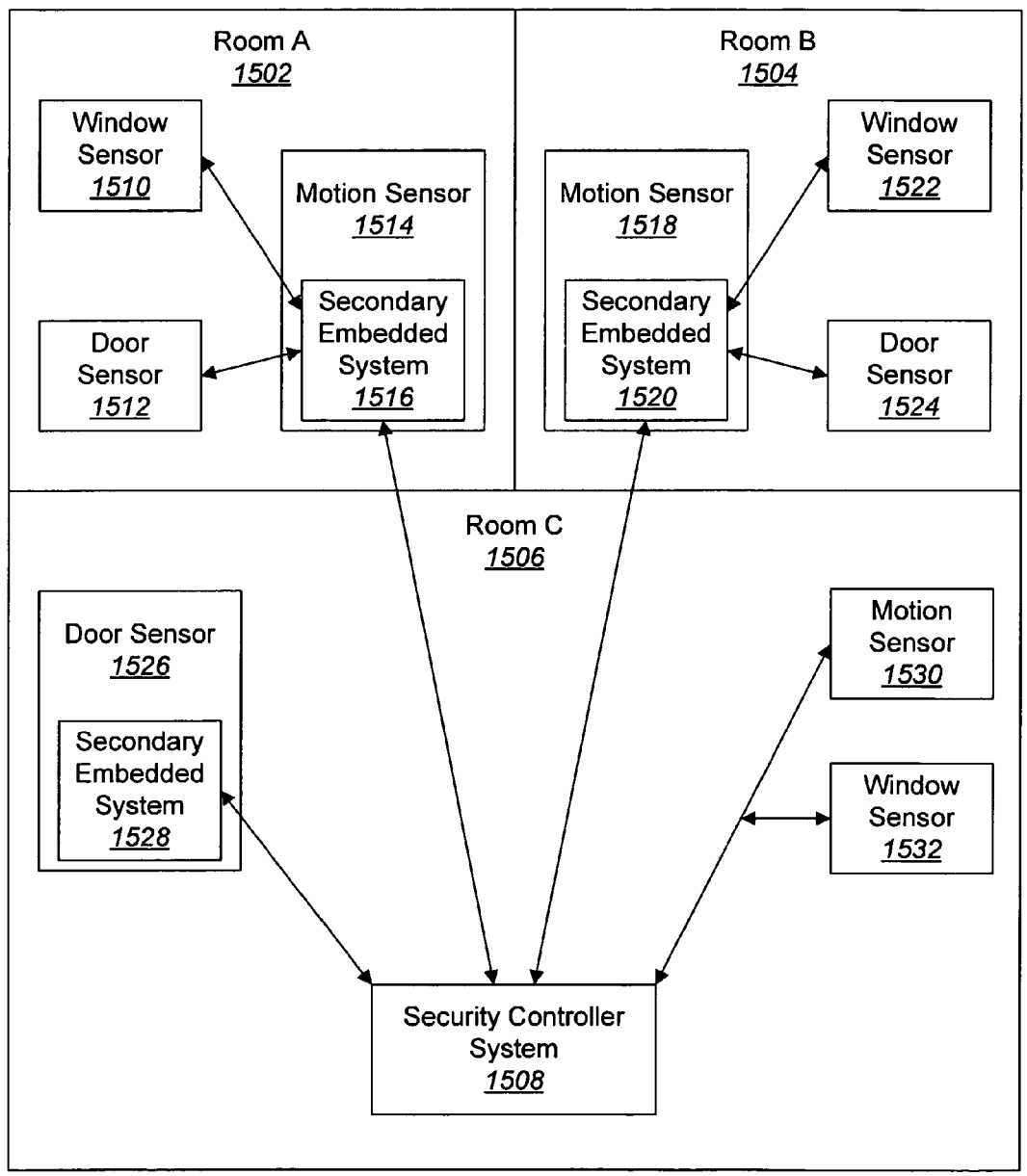
FIG. 15 illustrates an exemplary security system in which the present systems and methods may be implemented.

FIG. 15 is an additional embodiment of a system wherein the present systems and methods of the present invention may be implemented. FIG. 15 is a block diagram illustrating a security system 1500. The security system 1500 in the depicted embodiment is implemented in a room A 1502, a room B 1504, and a room C 1506. These rooms may be in the confines of a home or other enclosed environment. The system 1500 may also be implemented in an open environment where the rooms A, B and C, 1502, 1504, 1506 respectively represent territories or boundaries.

The system 1500 includes a security controller system 1508. The security controller system 1508 monitors and receives information from the various components within the system 1500. For example, a motion sensor 1514, 1518 may include a secondary embedded system 1516, 1520. The motion sensors 1514, 1518 may monitor an immediate space for motion and alert the security controller system 1508 when motion is detected via the secondary embedded system 1516, 1520. The security controller system 1508 may also provide instructions to the various components within the system 1500. For example, the security controller system 1508 may provide instructions to the secondary embedded systems 1516, 1520 to power up or power down a window sensor 1510, 1522 and a door sensor 1512, 1524. In one embodiment, the secondary embedded systems 1516, 1520 notify the security controller system 1508 when the window sensors 1510, 1522 detect movement of a window. Similarly, the secondary embedded systems 1516, 1520 notify the security controller system 1508 when the door sensors 1512, 1524 detect movement of a door. The secondary embedded systems 1516, 1520 may instruct the motion sensors 1514, 1518 to activate the LED (not shown) located within the motion sensors 1514, 1518.

The security controller system 1508 may also monitor and provide instructions directly to individual components within the system 1500. For example, the security controller system 1508 may monitor and provide instructions to power up or power down to a motion sensor 1530 or a window sensor 1532. The security controller system 1508 may also instruct the motion sensor 1530 and the window sensor 1532 to activate the LED (not shown) or audio alert notifications within the sensors 1530, 1532.

Each individual component comprising the system 1500 may also include a secondary embedded system. For example, FIG. 15 illustrates a door sensor 1526 including a secondary embedded system 1528. The security controller system 1508 may monitor and provide instructions to the secondary embedded system 1528 in a similar manner as previously described.

In the embodiment of FIG. 15, the security controller system 1508 may act as a client 104. The security controller system 1508 may desire access to one of the sensors 1510, 1512, 1522, 1524, 1526, 1530, 1532. which may be treated as devices 102. Secondary embedded systems 1516, 1520, 1528 may act as both a security broker 110 and a device 102. The security controller system 1508 may request access to the secondary embedded systems 1516, 1520, 1528 from a trust manager 108. When the trust manager 108 grants a secure trusted connection between the secondary embedded systems 1516, 1520, 1528 and the security controller system 1508, these sensors 1510, 1512, 1522, 1524, 1526, 1530, 1532 may provide data regarding their status. For example, the window sensors 1510, 1522, 1532 may provide data regarding whether they are open or closed.

Figure 16:
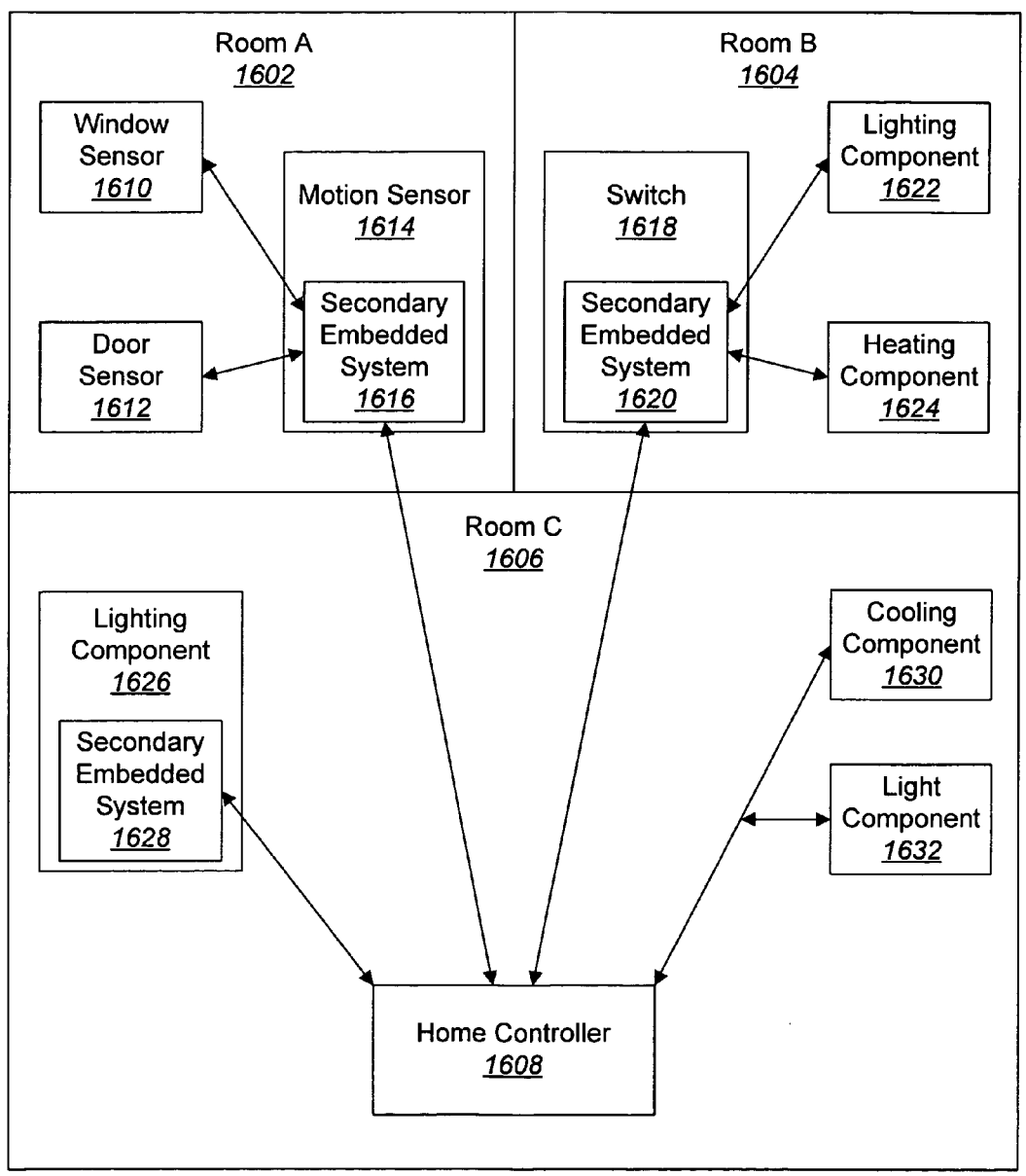
FIG. 16 illustrates an exemplary home controller system in which the present systems and methods may be implemented.

FIG. 16 is a block diagram illustrating one embodiment of a home system 1600. The home system 1600 includes a home controller 1608 that facilitates the monitoring of various systems such as the lighting system 1400, the security system 1500, and the like. The home system 1600 allows a user to control various components and systems through one or more embedded systems. In one embodiment, the home controller system 1608 monitors and provides information in the same manner as previously described in relation to FIGS. 14 and 15. In the depicted embodiment, the home controller 1608 provides instructions to a heating component 1624 via a secondary embedded system 1620. The heating component 1624 may include a furnace or other heating device typically found in resident locations or offices. The home controller system 1608 may provide instructions to power up or power down the heating component 1624 via the secondary embedded system 1620.

Similarly, the home controller 1608 may monitor and provide instructions directly to a component within the home system 1600 such as a cooling component 1630. The cooling component 1630 may include an air conditioner or other cooling device typically found in resident locations or offices. The central home controller 1608 may instruct the cooling component 1630 to power up or power down depending on the temperature reading collected by the central embedded system 1608. The home system 1600 functions in a similar manner as previously described in relation to FIGS. 14 and 15.

In the embodiment of FIG. 16, the home controller system 1608 may act as a client 104. The home controller system 1608 may desire access to the window sensor 1610, door sensor 1612, heating component 1624, cooling component 1630, or lighting components 1622, 1626, 1632, all of which may be treated as devices 102. Secondary embedded systems 1616, 1620, 1628 may act as both a security broker 110 and a device 102. The home controller system 1608 may request access to the secondary embedded systems 1616, 1620, 1628 from a trust manager 108. When the trust manager 108 grants a secure trusted connection between the secondary embedded systems 1616, 1620, 1628 and the home controller system 1608, these elements 1610, 1612, 1622, 1624, 1626, 1630, 1632 may provide data regarding their status. For example, the heating and cooling components 1624, 1630 may provide data regarding the present temperature in their respective rooms 1604, 1606. The heating and cooling components 1624, 1630 may provide data regarding the status of the component, whether it is on or off, its recent power usage, any system errors, etc.

There are many types of embedded devices and many reasons for creating device networks. Several examples of device networking applications will be set forth. It will be appreciated by those skilled in the art that the examples discussed are not exhaustive.

One example of a device networking application is remote monitoring. Many useful device networks involve remote monitoring, the one-way transfer of information from one node to another. In these applications, providers typically act as small servers that report certain information in response to a requestor. Providers can also be set up to publish their state information to subscribers. A requestor may ask for periodic reports or for updates whenever the state changes, perhaps with some means of limiting how often updates are to be sent. Providers can be set up to notify requesters when some event or exceptional condition occurs.

Another example of a device network application is remote control, where requestors are able to send commands to providers to invoke some specific action. In most cases, remote control involves some sort of feedback.

A still further example of a device networking application is distributed control systems. The functions and data associated with individual providers can be combined and coordinated through a network to create a distributed system that provides additional value. Sometimes these distributed control systems can be established more or less automatically. In many cases, a more sophisticated device joins a peer-to-peer network to perform configuration, monitoring or diagnostic duties. Such systems may be created by objects that communicate as peers or through a master-slave configuration, in which each object in the system communicates with a single, central node that contains all of the control logic.

With each category of networking application, there are a variety of ways in which requestors may connect to providers. When a relatively small number of providers are involved, a requestor may use a web browser, pager or even a WAP-enabled cell phone to communicate with a provider in a more or less interactive manner. As the number of providers grows, however, these methods may become unworkable and requesters may employ more general data management techniques such as a spreadsheet or database application.

As a variety of networks are implemented over time and with different technologies, the situation can arise in which multiple networks might sit in the same home or facility, each using their own protocols and unable to communicate with the others. In this case, the various networks and protocols can be bridged to create a single, larger network. This can allow a single application to access each provider, simplifying the interaction with all of the providers.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for providing secure access to embedded devices, the method being implemented by a trust manager, the method comprising:
   receiving client account information from a client;
   determining whether the client account information from the client is valid;
   determining whether the client is authorized to access at least one embedded device that is in electronic communication with a security broker;
   receiving security broker account information from the security broker;
   determining whether the security broker account information from the security broker is valid;
   determining whether the security broker is authorized to provide access to the at least one embedded device; and
   if the client account information from the client is valid and the client is authorized to access the at least one embedded device, and if the security broker account information from the security broker is valid and the security broker is authorized to provide access to the at least one embedded device, establishing a secure trusted connection between the client and the security broker.

2. The method of claim 1, wherein the method is performed in response to receiving a request from the client for access to the at least one embedded device.

3. The method of claim 1, wherein the method is performed in response to receiving a request from the security broker to provide access to the at least one embedded device.

4. The method of claim 1, wherein the client account information comprises:
   security credentials for the client; and
   authorization information for the client.

5. The method of claim 4, wherein the security credentials for the client comprise a client identifier and a client secret.

6. The method of claim 4, wherein the authorization information for the client comprises device access permissions.

7. The method of claim 1, wherein determining whether the client account information is valid comprises comparing the client account information that was received from the client with validated client account information.

8. The method of claim 7, wherein the validated client account information is stored on the trust manager.

9. The method of claim 1, wherein the security broker account information comprises:
   security credentials for the security broker; and
   authorization information for the security broker.

10. The method of claim 9, wherein the security credentials comprise a security broker identifier and a security broker secret.

11. The method of claim 9, wherein the authorization information for the security broker comprises device provide permissions.

12. The method of claim 1, wherein determining whether the security broker account information is valid comprises comparing the security broker account information that was received from the security broker with validated security broker account information.

13. The method of claim 12, wherein the validated security broker account information is stored on the trust manager.

14. A trust manager that is configured to implement a method for providing secure access to embedded devices, the trust manager comprising:
   a processor;
   memory in electronic communication with the processor;
   instructions stored in the memory, the instructions being executable to implement a method comprising:
      receiving client account information from a client;
      determining whether the client account information from the client is valid;
      determining whether the client is authorized to access at least one embedded device that is in electronic communication with a security broker;
      receiving security broker account information from the security broker;
      determining whether the security broker account information from the security broker is valid;
      determining whether the security broker is authorized to provide access to the at least one embedded device; and
      if the client account information from the client is valid and the client is authorized to access the at least one embedded device, and if the security broker account information from the security broker is valid and the security broker is authorized to provide access to the at least one embedded device, establishing a secure trusted connection between the client and the security broker.

15. The trust manager of claim 14, wherein the method is performed in response to receiving a request from the client for access to the at least one embedded device.

16. The trust manager of claim 14, wherein the method is performed in response to receiving a request from the security broker to provide access to the at least one embedded device.

17. The trust manager of claim 14, wherein the client account information comprises security credentials for the client and authorization information for the client, and wherein the security broker account information comprises security credentials for the security broker and authorization information for the security broker.

18. A computer-readable medium comprising executable instructions for implementing a method for providing secure access to embedded devices, the method being implemented by a trust manager, the method comprising:
   receiving client account information from a client;
   determining whether the client account information from the client is valid;
   determining whether the client is authorized to access at least one embedded device that is in electronic communication with a security broker;
   receiving security broker account information from the security broker;
   determining whether the security broker account information from the security broker is valid;
   determining whether the security broker is authorized to provide access to the at least one embedded device; and
   if the client account information from the client is valid and the client is authorized to access the at least one embedded device, and if the security broker account information from the security broker is valid and the security broker is authorized to provide access to the at least one embedded device, establishing a secure trusted connection between the client and the security broker.

19. The computer-readable medium of claim 18, wherein the method is performed in response to receiving a request from the client for access to the at least one embedded device.

20. The computer-readable medium of claim 18, wherein the method is performed in response to receiving a request from the security broker to provide access to the at least one embedded device.

* * * * *

UNITED STATES PATENT AND TRADEMARK OFFICE
CERTIFICATE OF CORRECTION

| | | |
|---|---|---|
| PATENT NO. | : 7,614,080 B2 | Page 1 of 1 |
| APPLICATION NO. | : 11/320164 | |
| DATED | : November 3, 2009 | |
| INVENTOR(S) | : Thomas Milligan et al. | |

It is certified that error appears in the above-identified patent and that said Letters Patent is hereby corrected as shown below:

In Column 15, line 40 please replace "requesters" with --requestors--.
In Column 15, line 66 please replace "requesters" with --requestors--.

Signed and Sealed this

Eighteenth Day of May, 2010

David J. Kappos
*Director of the United States Patent and Trademark Office*